United States Patent [19]

Betsch et al.

[11] Patent Number: 4,580,203

[45] Date of Patent: Apr. 1, 1986

[54] ILLUMINATING DEVICE

[75] Inventors: Helmut Betsch, Sachsenheim; Herbert Teply, Kirchheim, both of Fed. Rep. of Germany

[73] Assignee: ITT Industries, Inc., New York, N.Y.

[21] Appl. No.: 613,603

[22] Filed: May 23, 1984

[30] Foreign Application Priority Data

May 27, 1983 [DE] Fed. Rep. of Germany ....... 3319231

[51] Int. Cl.⁴ .............................................. F21V 29/00
[52] U.S. Cl. ..................................... 362/294; 362/373
[58] Field of Search ....................... 362/23, 25, 26, 28, 362/29, 30, 77, 85, 294, 373

[56] References Cited

U.S. PATENT DOCUMENTS 4,188,654  2/1980  Reich et al. ......................... 362/294
4,329,736  5/1982  Nelle et al. ............................ 362/23

FOREIGN PATENT DOCUMENTS 1416307  9/1965  France ................................... 362/23

Primary Examiner—William A. Cuchlinski, Jr.
Attorney, Agent, or Firm—James B. Raden; Donald J. Breh

[57] ABSTRACT

An illuminating device for use in an automotive vehicle for panel lighting, in which the holder carrying the panel lighting incandescent lamp is composed of two electrically conductive contact plates, between which is inserted an insulating foil plate. The two conductive plates are superimposed and fixed to each other with the foil plate between, whereby the contact webs or terminals for connecting the incandescent lamp are integrally formed out of these contact plates.

12 Claims, 8 Drawing Figures

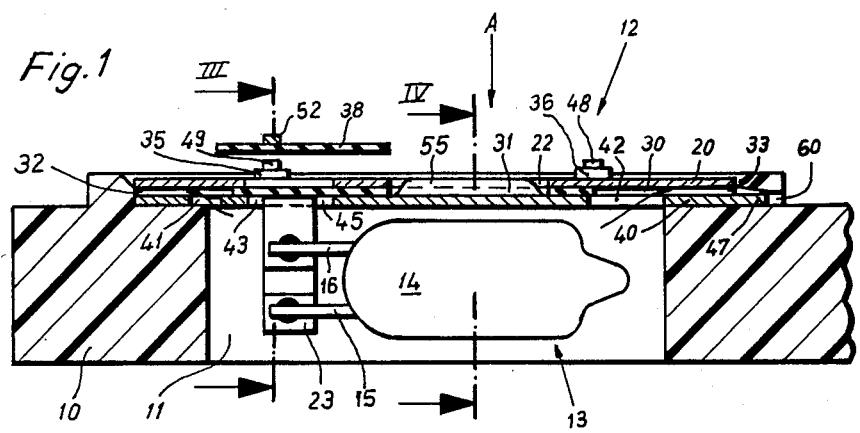
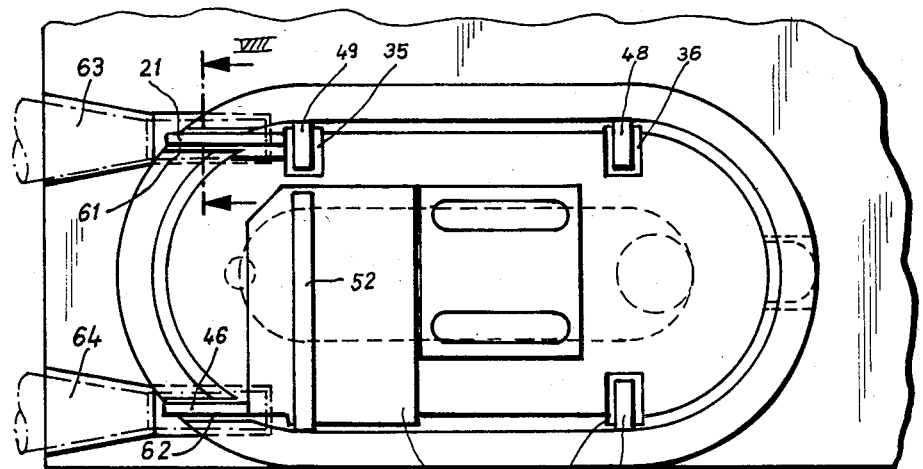
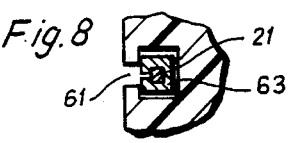
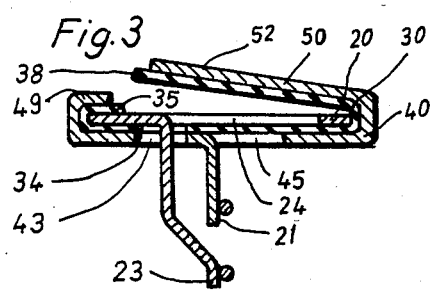
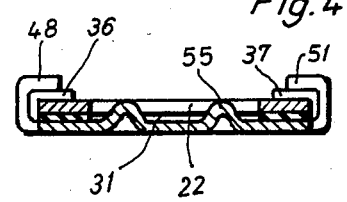

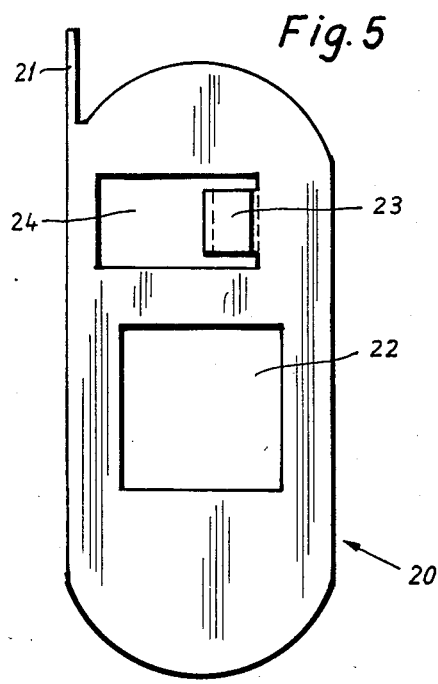
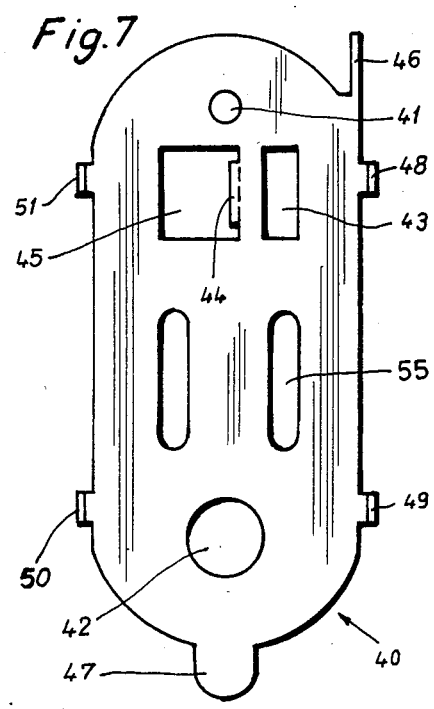
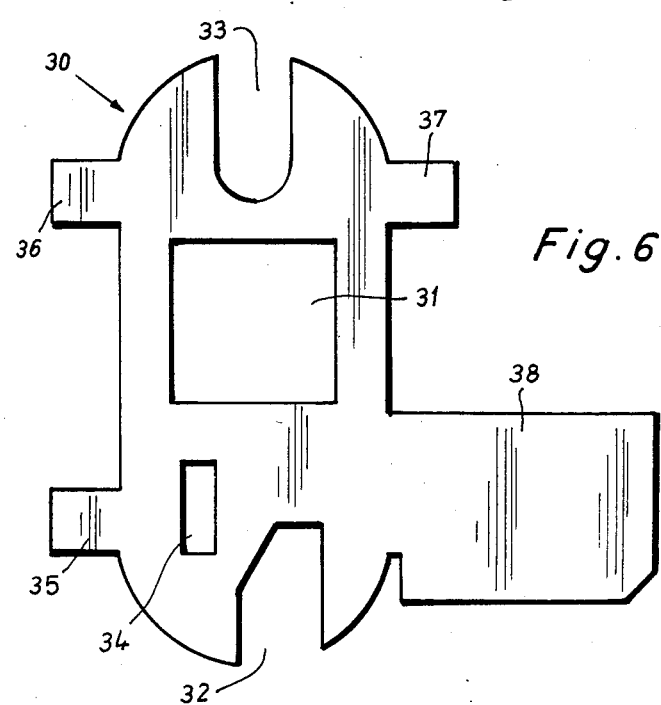

ILLUMINATING DEVICE

BACKGROUND OF THE INVENTION

For the illumination of motor vehicle instrument panels, especially those using passive elctro-optical display devices large-area illuminants are needed. These large-area illuminants are formed as a light-guide plate into which one or more incandescent lamps can be inserted. Because the available space in a motor vehicle is relatively restricted, it is usual to form the holders for these incandescent lamps in such a way that their overall height including the incandescent lamp is not greater than the thickness of this light-guide plate. Furthermore the problem of heat dissipation is increased in this type of display because incandescent lamps with a relatively high efficiency are needed. Further since some applications require that light must not emerge at the back of the holder, the plate must be constructed to block the emergence of rear lighting.

In general, known illuminating devices which could be used for such applications are formed with contact webs of plastics material fixed on a holder to which the connections to the incandescent lamp are connected. These known embodiments ensure that no light can emerge towards the back, however the heat created by the incandescent lamp can not readily be dissipated. Furthermore it is difficult to secure the contact webs on the insulating holder.

SUMMARY OF THE INVENTION

The present invention solves the problem of creating an illuminating device comprising a holder carrying an incandescent lamp, which holder meets the stated requirements and which can be produced economically. The stated requirements as noted are (1) Ready heat dissipation (2) Prevention of escape of back lighting and (3) Ready mounting of the contact webs to the holder.

The invention is thereby based on the idea of fabricating the holder of material which is current-carrying metal. The need for an additional plastics holder can be saved by the insertion of an insulating foil sheet between two contact plates, which are super-imposed and fixed on each other. Due to the contact plates being metallic, heat is dissipated more readily. The insulating foil can be produced more economically than known plastics mounting plates. In addition, the overall height of the holder is reduced by this design.

In the case of incandescent lamps with connections arranged on opposite sides of a cylindric glass body, the contact web integrally bent from the contact plate can be extended laterally past the rim of the other contact plate. In principle, this is even possible, if the incandescent lamp, for example a tungsten halogen lamp, has its two connections on the same front side of the glass body. However, in a preferred form of the present invention, the contact web of one contact plate extends through a recess in the insulating foil and a recess in the other contact plate. This enables the contact webs to be positioned very close to one other without a great loss of material when making the contact plates.

Because insulating foil is normally a poor heat conductor, the insulating foil may be provided with apertures according to a preferred embodiment of the invention. These apertures can be as large as possible, so that the heat reflected from the contact plate facing the incandescent lamp can be transmitted onto the other contact plate unimpededly. The dissipation of heat can be further improved in that the contact plate facing the incandescent lamp is also provided with apertures, through which the heated air can be carried off. In this case, individual apertures of the insulating foil will be open-edged, so that cooling air can be laterally conducted out of the holder. Moreover, it is possible, to provide apertures also in the contact plate facing away from the incandescent lamp, which apertures are arranged at a slanting angle relative to the apertures of the other contact plate. Thus a labyrinth-shaped path for the heated air being dissipated is created without light emerging at the back.

In one embodiment, in which the contact web of one contact plate extends through a recess in the other contact plate, the overlap of the contact plate apertures cannot be completely avoided. It is therefore suggested to cover these overlapping apertures with insulating foil of an opaque material.

BRIEF DESCRIPTION OF THE DRAWING

The invention and further advantageous embodiments are described below in detail by way of the embodiment shown in the accompanying drawing, in which FIG. 1 is a longitudinal section through an assembled illuminating device according to the invention, FIG. 2 is a plan view in direction of arrow A of FIG. 1, FIG. 3 is a section taken on the line III of FIG. 1, FIG. 4 is a section taken on the line IV of FIG. 1, FIG. 5 is a plan view of the upper contact plate, FIG. 6 is a plan view of the insulating foil, FIG. 7 is a plan view of the lower contact plate and FIG. 8 is a partial section taken on the line VIII of FIG. 2.

DETAILED DESCRIPTION OF THE DRAWING

In FIG. 1, there is shown a receiving body designated 10, namely a light-guide plate which has a substantially oval receiver opening 11 for an illuminating device. The illuminating device includes an assembled holder designated 12. The holder carries an incandescent lamp 13 having a glass body 14 which is substantially cylindrical and aligned in parallel to the length of the holder 12. From the glass body protrudes two wire or electrical terminal connections 15 and 16 in parallel to the lamp axis.

The holder as viewed in FIG. 1 has an upper contact plate 20, an insulating foil 30 and a lower contact plate 40 which are shown in FIGS. 5, 6 and 7 as individual piece parts. From these figures it is clear that these three piece parts have a similar oval configuration as the outer contour. These parts, combinedly cover the incandescent lamp completely, so that a light shield is obtained in the direction opposite arrow A (of FIG. 1). The upper contact plate 20 as seen in FIG. 5 has a connector tab 21, extending from one corner whose width corresponds approximately to the thickness of the contact plate 20. This connector tab 21 has a substantially square cross-section. In its center area, contact plate 20 has an almost square apperture 22. Integrally with the contact plate 20 is formed a contact web 23, which projects substantially rectangularly, from the main plate. One connection terminal 15 of the incandescent lamp is soldered or welded to this web 23. Because the contact web 23 is formed in one piece out of the contact plate 20, a further aperture 24 is formed which is substantially rectangular.

FIG. 6 shows that the insulating foil 30 has also a square aperture 31 in its main body. This aperture 31 is congruently aligned with the aperture 22 of the upper contact plate 20. The insulating foil has two further inset openings 32 and 33, open towards the rim of the foil. A recess 34 can be seen in FIG. 6, through which recess the contact web 23 of the upper contact plate 20 is inserted when the holder 12 is assembled with the foil 30 inverted from the position of FIG. 6. Studs 35, 36 and 37 project from the longitudinal sides of the insulating foil 30, which studs are bent round the rim of the upper contact plate 20 to join the foil to the insulating plate. Moreover, a large rectangular lug 38 can be seen in FIG. 6, which lug is also bent round the rim of the upper contact plate 20 to cover opening 24 and serve as a light shield. The insulating foil 30 is made of an opaque material to provide light shielding.

As seen in FIG. 7, the lower contact plate 40 has two circular apertures 41 and 42 which, when the parts are mounted, overlie the area of the open-edged apertures 33 and 32 of the insulating foil 30. The lower contact plate 40 has also a rectangular recess 43, through which extends the contact web 23 of the upper contact plate 20. Contact web 44 is formed out of the lower contact plate 40 to create further aperture 45. The lower contact plate 40 has also a connector 46 with a tab extending from one corner and a detent 47 extending from the opposite side. Four holding claws 48, 49, 50 and 51 project from the longitudinal sides of the lower contact plate 40. These holding claws, when mounted, are bent round the studs 35, 36 and 37 of the insulating foil 30 and round the upper contact plate 20 and thus physically interconnect all three parts. In the center area the contact plate 40 has ribs 55 to enlarge the surface area of this contact plate to enhance its heat transfer capability. After assembly, these ribs 55 lie in the open area of the square apertures 22 and 31 of the upper contact plate and of the insulating foil respectively.

From the assembly drawings of FIGS. 1 to 4, it can be seen that the two contact plates 20 and 40 have apertures which are arranged in a slanting manner to one another. For example, the upper contact plate 20 has a square aperture 22 in the area in which the lower contact plate 40 has no aperture, but has instead additional cooling ribs. On the other hand, the lower contact plate 40 has circular openings 41 and 42 in an area in which the upper contact plate 20 is solid. Moreover, the insulating foil has open-edged insets 31 and 32 in these areas, so that heated air can stream off sidewards as is shown by arrows.

There are superimposed apertures in the two contact plates and in the insulating foil in the area in which the contact web 23 of the upper contact plate is conductively connected to the opposite side of the lower contact plate 40, as can be seen in FIG. 3. In order to prevent an emerging of light in the downward direction in this area, this area is covered by the bent back lug 38.

This lug 38 is held in an inclined position by an elongated stud 50 of the lower contact plate 40, so that again a labyrinth-shaped channel for the heated air is formed without permitting the light to emerge in the upward direction.

The entire structural unit of holder 12 and incandescent lamp 13 is held on the receiving body without additional mounting means. The lamp is welded to the web 23 and the plates and foil are assembled together using the peripheral studs 48–51. The detent 47 of foil 30 engages in a recess 60 of the receiving body 10. Moreover, the connector tabs 21 and 46 of the respective plates 20 and 40 are positioned in grooves 61 and 62 of the body, whereby at first the width of the grooves corresponds approximately to the width of these connectors. At a small spacing from the surface of the receiving body 10, the grooves 61 and 62 widen in such a way that receptacles 63 and 64 can be slipped onto these connectors 21 and 46 from the rim of the receiving body. Because the cross-section of these receptacles is larger than the narrower section of the grooves 61 and 62, this structural unit with the receptacles is reliably held on the receiving body, when the wires are connected.

A preferred embodiment is shown in the drawings, in which the following basic features are shown:

The holder is made without additional parts other than the plates, insulating foil and lamp by using the plates as the conductors carrying the current to the lamp connections with a thin insulating foil inserted betwen the metallic mounting plates. Additional plastics parts are not needed.

The piece parts of the holder are provided with recesses and apertures in such a way that heated air is carried off without pemitting light to emerge in upward direction. This feature is achieved by providing labyrinth-shaped paths for the air.

The structural unit is held on the receiving body without additional connecting means, so that it can be easily exchanged if necessary.

In another embodiment (not shown in detail in the drawing), a holding lug is bent out of the lower contact plate which holding lug engages behind a stud in the receiving body.

A solution of this kind will be preferred when the connecting wires are to be soldered to the connectors 21 and 26. Moreover, in this embodiment, the upper contact plate has slantingly projecting areas above apertures in the lower contact plate to space the two plates apart, so that an even better heat dissipation is achieved. It is true however that this measure increases the overall height of this illuminating device.

Finally, the three parts of the holder need not necessarily have the same or substantially the same outside contour. For example, only the left-hand section from the connector 21 to the contact plug 23 is needed of the upper contact plate. However the stability of the entire structural unit becomes less satisfactory, when the upper contact plate is made smaller as indicated. Moreover, no labyrinth-shaped paths for heated air can be realised by remaining areas of the lower contact plate.

FIG. 3 shows that the lug 38 may be held in an inclined position, so that air can be carried off in upward direction from this area. However this construction would permit a small quantity of light to emerge in this place by multi-reflection. This light emergence can be prevented by folding the lug of FIG. 3 in a downward direction, so that it directly rests upon the upper contact plate 20 causing a worsening of the heat dissipation. Thus a person skilled in the art will aim at a compromise depending on the requirements and priorities, understanding that the transmission of heat is especially good when several paths are created for the air streaming off, so that the air can circulate.

What is claimed is:

1. An illuminating device, for use in a light-guide plate of a motor vehicle instrument panel, comprising a holder for carrying an incandescent lamp, said holder having fixed contact webs projecting substantially rectangular towards the same side, including thereof said contact webs being connected in an electrically conductive manner with connections of the incandescent lamp protruding from a substantially cylindric glass body which is aligned in parallel to the holder, the invention in which the holder is composed of two electrically conductive plates, between which an insulating foil plate is inserted and which plates are superimposed and fixed on each other, and that the contact webs are integrally formed with these contact plates.

2. An illuminating device according to claim 1, in which the contact web of the upper contact plate projects through a recess of the insulating foil and through a recess of the lower contact plate.

3. An illuminating device according to claim 1, in which the lower contact plate is provided with apertures which are arranged so as to at least partly cover apertures in the insulating foil.

4. An illuminating device according to claim 3, in which the upper contact plate has at least one aperture which is arranged in a slanting manner to the apertures of the insulating foil and the lower contact plate respectively.

5. An illuminating device according to claim 1, in which at least one of the contact plates is provided with protruding cooling ribs for heat transfer.

6. An illuminating device according to claim 1, in which the insulating foil is opaque and covers overlapping apertures and recesses above the upper contact plate.

7. An illuminating device according to claim 6, in which the insulating foil has a lug bent around the upper contact plate, which lug covers the recess of the insulating foil and the recess of the lower contact plate through which the contact web of the upper contact plate extends.

8. An illuminating device according to claim 1, in which the insulating foil has laterally projecting studs, which studs are bent around one of the contact plates and in that, in the area of these studs, holding claws of the other contact plate are bent round these studs.

9. An illuminating device according to claim 8, in which one of these holding claws serves as a support for the lug of the insulating foil which projects from the upper contact plate, in certain circumstances also at a particular angle.

10. An illuminating device according to claim 1, in which the contact plates are integrally formed with connectors for slide on electrical connection of receptacles from electric source leads.

11. An illuminating device according to claim 1, in which one of the contact plates has a protruding detent which is insertable into a recess of the receiving body carrying the holder, and that the connectors are insertable into open-edged grooves of the open body, wherein the cross-section of these grooves is chosen so as to effect a form-fit connection between these connectors and the receiving body, when the receptacles have been slipped on the connectors.

12. A device for illuminating an instrument panel adapted for use in a motor vehicle, said device comprising a holder for an incandescent lamp, said holder including a plurality of superimposed plates of generally similar outer body configuration, said plates including a first and a second conducting plate separated by an insulating plate, said conducting plates including conductive webs for connection to the lamp to energize the lamp when the plates are connected to a source of current, said webs extending angularly from the body of the conducting plates, and studs extending from the body of the insulating plate for physically clamping said conducting plates to join said plates in said holder, said insulating plate fabricated of optically opaque material with internal openings generally superimposed over material of the conducting layers to prevent light from passing through the holder.

* * * * *